March 26, 1929.   A. B. COFFIN ET AL   1,706,914
ROAD DRAG
Filed June 9, 1928   3 Sheets-Sheet 1

INVENTORS,
Arthur B. Coffin, and
John C. Haskett,
By
Minturn & Minturn
Attorneys.

March 26, 1929.   A. B. COFFIN ET AL   1,706,914
ROAD DRAG
Filed June 9, 1928   3 Sheets-Sheet 3

INVENTORS,
Arthur B. Coffin and
John C. Haskett,
By Minturn & Minturn,
Attorneys.

Patented Mar. 26, 1929.

UNITED STATES PATENT OFFICE.

ARTHUR B. COFFIN AND JOHN C. HASKETT, OF SPICELAND, INDIANA.

ROAD DRAG.

Application filed June 9, 1928. Serial No. 284,036.

This invention relates to road drags of the type particularly adapted for the maintenance of a road, and has for its primary purpose the provision of means for dragging that may be quickly attached and detached to and from an ordinary truck, that may be quickly raised and lowered in relation to the road to permit turning around of the truck in a limited area and to permit crossing of a railroad without having to stop the truck, that may be variably adjusted to cut and drag the road to meet the surface conditions of the road as the truck moves along, all of such adjustments being made by the truck driver without his having to leave his seat, that is not affected by the vertical rise and fall of the front wheels of the truck, and that will permit the shaving off of the high spots in the road and effectually carry the loosened gravel back and forth over the roadway several times to be finally levelled down without causing the truck wheels to travel at any time on the loosened or spread gravel.

The invention is herebelow described in one particular form as shown by the accompanying drawings, in which—

Figure 1:
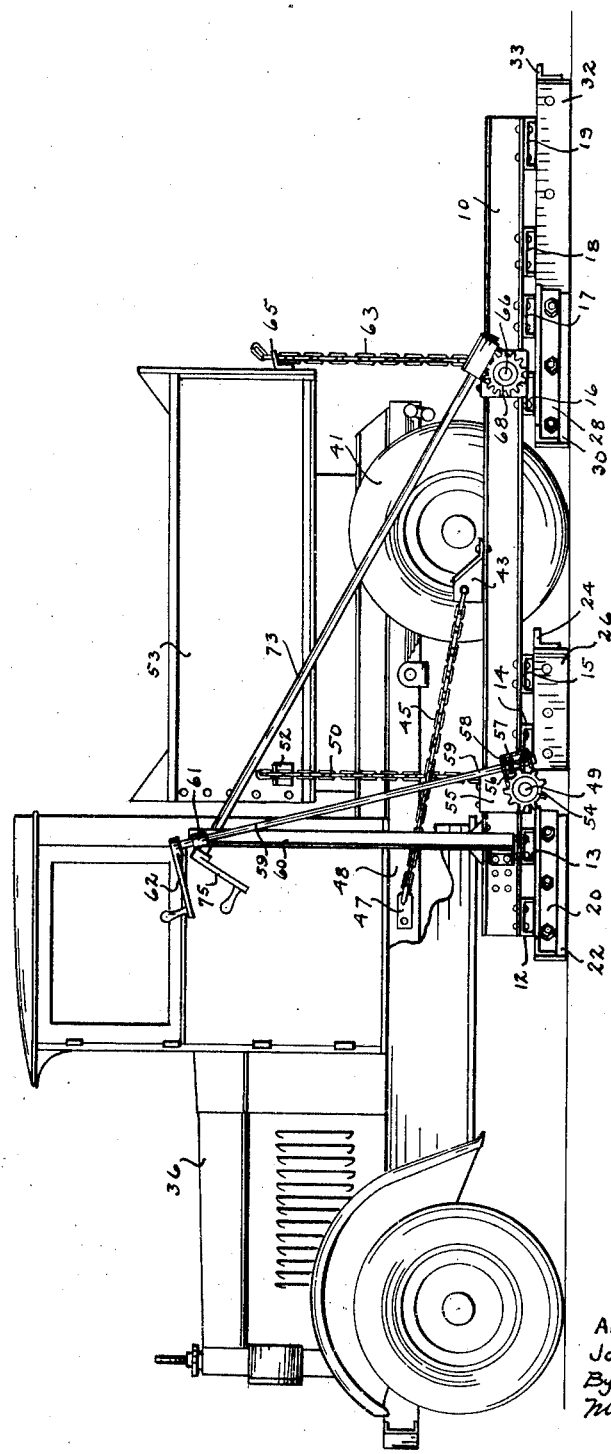
Figure 2:
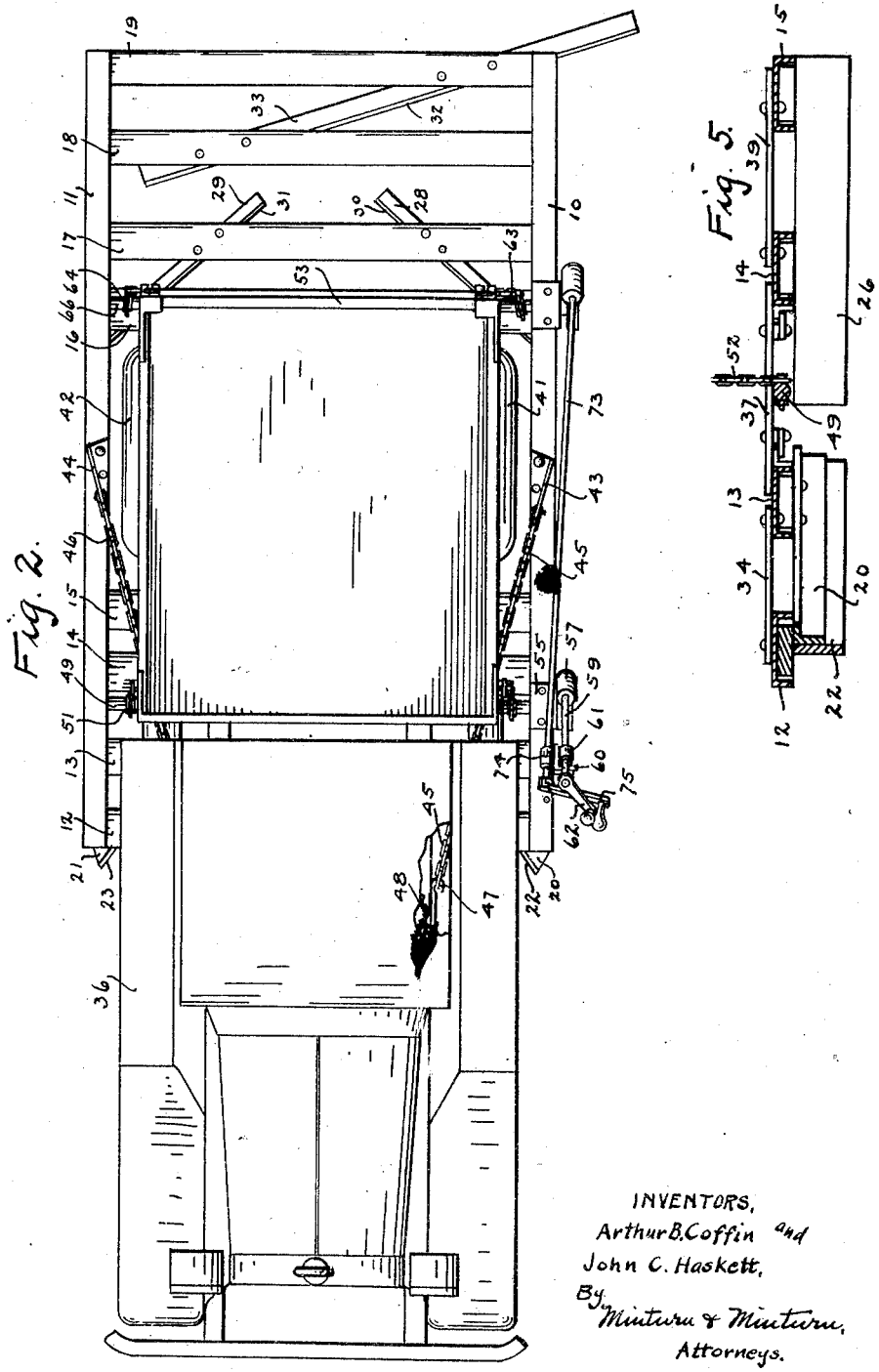
Figure 3:
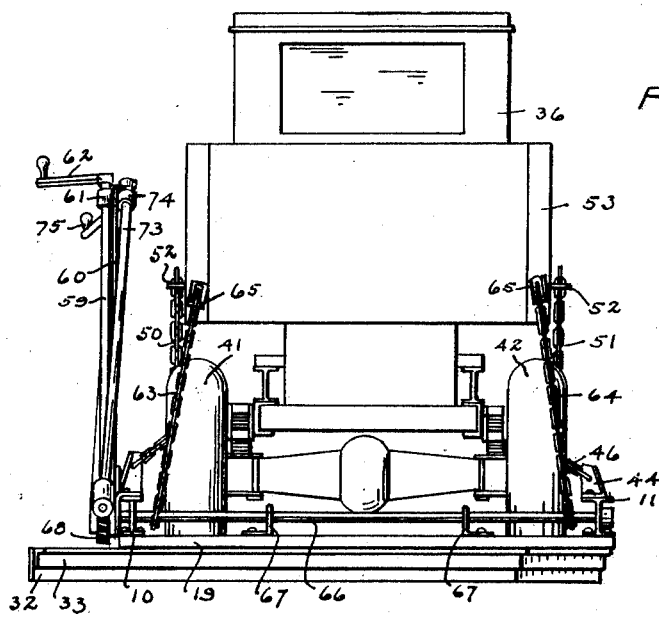
Figure 4:
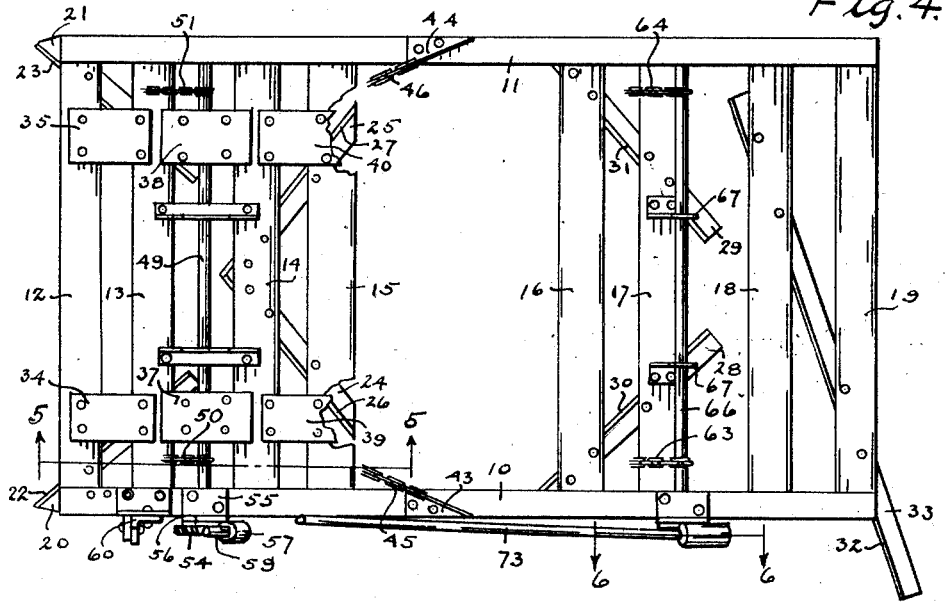
Figure 6:
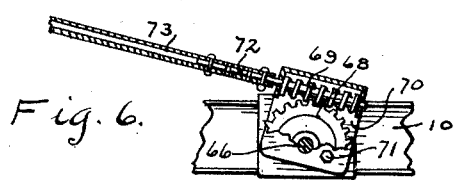

Fig. 1 is a side elevation of a drag embodying our invention as applied to a truck;

Fig. 2, a top plan view of the truck with the drag;

Fig. 3, a rear elevation of the truck and drag;

Fig. 4, a top plan view of the drag only;

Fig. 5, a longitudinal vertical section on the line 5—5 in Fig. 4 on an enlarged scale; and Fig. 6, a longitudinal vertical section on the line 6—6 in Fig. 4.

Like characters of reference indicate like parts throughout the several views in the drawings.

The drag is preferably made with two spaced apart I beams 10 and 11 as side rails, to the under side of which are riveted a plurality of channel members 12, 13, 14, 15, 16, 17, 18 and 19, to have the members 12, 13, 14, and 15 transversely spaced apart near the forward end of the beams 10 and 11 and the members 16, 17, 18, and 19 spaced apart near the rear end, Figs. 1 and 4, whereby there is an appreciable space between the members 15 and 16.

To the underside of the members 12 and 13 are riveted the angles 20 and 21, each set to extend obliquely from the outer forward corner of the rectangular frame formed by the beams and channels rearwardly and inwardly toward the longitudinal center line with an appreciable space left between the rear ends. Cutter bars 22 and 23 are bolted to the forward vertical faces of the angles 20 and 21 respectively.

The angles 24 and 25 are riveted to the under sides of the channel members 14 and 15, to have their forward ends meet on the center line and to extend obliquely therefrom outwardly and rearwardly, Fig. 4, to form a V as viewed from the front end, the apex of the V coming substantially on the line between the rear ends of the two angles 20 and 21. Cutter bars 26 and 27 are bolted to the forward vertical faces of the angles 24 and 25.

The angles 28 and 29 are riveted to the under sides of the channel members 16 and 17 to have their forward ends positioned under the side beams 10 and 11 and to extend obliquely therefrom inwardly and rearwardly toward the center line with an appreciable space between the rear ends, and cutter bars 30 and 31 are bolted to the forward vertical sides of the angles.

A long cutter bar 32 is obliquely positioned on the angle 33 riveted to the rear channels 18 and 19 to lie behind the ends of the bars 30 and 31, to extend from a point just inside the beam 11 rearwardly and across to extend beyond the beam 10 for a short length.

Bridge plates 34 and 35 are riveted to the top sides of the channels 12 and 13 (Figs. 4 and 5) spaced apart the width of the tread of the usual truck 36, and between the channels 13 and 14, the plates 37 and 38 are fitted to be moved slidingly therebetween, while the plates 39 and 40 are riveted to the channels 14 and 15 in line with the plates 34 and 35.

The truck 36 is backed up to and over the front end of the drag to have the wheels 41 and 42 roll over the plates 34, 37, and 39 and 35, 38 and 40 respectively and down again onto the ground between the channels 15 and 16, there being clearance around the wheels sideways between the beams 10 and 11 and fore and aft between the channels 15 and 16.

From the brackets 43 and 44 secured to the beams between the channels 15 and 16, extend the chains 45 and 46, which may be adjustably engaged over the hooks 47 attached to the truck frame 48 to position the drag properly in relation to the rear wheels 41 and 42, it being noted, Fig. 2, that the chains are carried obliquely inwardly and forwardly to the truck frame. The drag is thus hooked up to the truck to be pulled not from its front end but from near its center so that the drag may be free to rock fore and aft as it is pulled.

A shaft 49 is rotatably mounted between and under the beams 10 and 11 to pass between the channels 13 and 14, and chains 50 and 51 are attached by their ends to the shaft 49 so that rotation of the shaft will wrap the chains therearound. The chain 50 is secured to the shaft 49 just inside the beam 11 while the chain 51 is secured to the shaft 49 near the other end just inside the beam 10. Hooks 52 are attached to the sides of the body 53 of the truck 36 and the chains 50 and 51 are brought up vertically and engaged thereon. It is obvious that if the chains are of unequal length, and the shaft 49 is revolved, one side of the drag may be lifted before the other, and the chains 50 and 51 may therefore be adjustably engaged on the hooks 52 as to length to give a straight or angular lift as desire.

The shaft 49 carries a gear wheel 54 on its outer end outside of the beam 10, the angle plate 55 being secured to the beam 10 and carrying the shaft 49 therethrough near its bottom. Between the plate 55 and the gear 54 is a plate 56 rockably carried on the shaft 49, on the upper end of which is formed a worm housing 57 in which is carried the worm 58 in mesh with the gear 54. A shaft 59 extends from the worm 58 forwardly and upwardly to near the top end of the standard 60 carried vertically on the beam 10, where the shaft 59 is rotatably supported through the bracket 61 and a crank 62 is fixed on the end of the shaft 59 as a means of revolving the worm 58 to revolve in turn the shaft 49 to raise or lower the front end of the drag.

Similarly the rear end of the drag may be raised and lowered through chains 63 and 64 adjustably engaged by hooks 65 on the rear of the truck body 53 and attached by their lower ends to the transverse shaft 66 rotatably supported between the side beams 10 and 11 and further stiffened by the intermediate brackets 67. These rear chains 63 and 64 are preferably carried at an angle from the vertical, as in Fig. 3 to counteract any tendency of sideway of the drag.

A gear wheel 68 is fixed to the outer end of the shaft 66 and a worm 69 is carried on the plate 70 in mesh with the wheel 68, the plate 70 being rockably carried on the shaft 66 and fixed in position by the bolt 71 as in the case of the front worm carrier. A stub shaft 72 extends from the worm 69 and a tubular shaft 73 telescopes thereover and is fixed thereto and extends forwardly and upwardly to the top of the standard 60 through the bracket 74 and carries the crank 75 on the end.

The standard 60 may be adjustably positioned along the beam 10 in accordance with the location of the cab on the particular truck being employed to operate the drag, and to accommodate the shafts 59 and 73 to the various positions, the forward shaft 59 may be rocked sufficiently by rocking the plate 56 to give the required shaft angle, while the shaft 73 need not be changed as to angle of slope but may be lengthened by slipping the shaft 73 farther out on the stub shaft 72 and there secured. The standard 60 is so located that the driver of the truck may extend his arm from the truck conveniently and turn either or both cranks 62 and 75 as may be required.

As the drag is pulled over the road, gravel is loosened by the two front cutter bars 22 and 23 and carried inwardly to be discharged to the rear where the oppositely slanted bars 26 and 27 carry the gravel back outwardly equally to each side of the drag where the gravel is deposited just outside of the wheel tracks, and then the bars 30 and 31 collect the gravel so deposited and carry it back across to the center of the drag to deposit to the rear where the bar 32 spreads it back evenly over the roadway and lets the coarser material be deflected to be deposited in a line off the end of the bar extended beyond the side of the beam 10.

The weight of the drag runs over a ton and it thereby hangs snugly to the roadway without bouncing upwardly when projecting bumps or rocks are encountered. The crank 62 may be turned to lift or lower the front end of the drag, and the crank 75 similarly controls the elevation of the rear end, so that by watching the roadway, the drag may be suitably rocked or raised to meet the varying road conditions as encountered.

When the truck has reached the end of the road, the cranks 62 and 75 may be quickly turned to lift the drag clear of the road and the truck may turn around as usual and return home where the drag may be lowered to the ground, all of the chains unhooked from the truck, and the truck then driven forwardly clear of the drag.

The plates 37 and 38 are slidingly carried between the channels 13 and 14, so that as the chains 50 and 51 are wound about the shaft 49 and the chains thereby move longitudinally of the shaft and contact the plates 37 and 38, the plates are carried sideways by the chains to be out of the way when the drag is being raised or lowered.

While we have here shown and described our invention in one particular form, it is obvious that many structural changes may be made without departing from the spirit of the invention, and we, therefore do not desire to be limited to the said precise form, nor any more than may be required by the following claims.

We claim:

1. In a road drag, a frame; cutter bars carried by the frame; a transverse rotatable shaft at the front of the frame; a transverse rotatable shaft near the rear of the frame; chains secured to said shafts, one near each end of each shaft; and means for revolving said shafts.

2. In a road drag, a frame; cutter bars carried by the frame; a transverse rotatable shaft at the front of the frame; a transverse rotatable shaft near the rear of the frame; chains secured to said shafts, one near each end of each shaft; and means for revolving said shafts; said cutter bars being in two groups, one at the forward end and one at the rear end of the drag with an appreciable space therebetween; and hitch means secured to said frame between said two shafts.

3. In a road drag, a frame; cutter bars carried by the frame; a transverse rotatable shaft at the front of the frame; a transverse rotatable shaft near the rear of the frame; chains secured to said shafts, one near each end of each shaft; and means for revolving said shafts comprising a set of gearing on each shaft and cranks operating said gearing mounted to one side and above said frame.

4. In a road drag, a frame; cutter bars carried by the frame; a transverse rotatable shaft at the front of the frame; a transverse rotatable shaft near the rear of the frame; chains secured to said shafts, one near each end of each shaft; and means for revolving said shafts comprising a set of gearing on each shaft and cranks operating said gearing mounted to one side and above said frame; and means for adjustably positioning said cranks longitudinally of the frame.

5. In a combination with a truck, a road drag frame adapted to receive a pair of wheels of the truck therebetween; bridge means carried by the frame to permit the wheels to roll into and out of the frame; a front set of cutter bars adapted to move loosened gravel inwardly and then outwardly to each side of the pair of wheels; a set of rear cutter bars back of said wheels adapted to collect said gravel from the outside of the wheels and direct it back to the center of the frame; a spreader bar back of said rear cutter bars; and hitch means from said truck attached to said frame between said front and rear cutter bars.

6. In a combination with a truck, a road drag frame adapted to receive a pair of wheels of the truck therebetween; bridge means carried by the frame to permit the wheels to roll into and out of the frame; a front set of cutter bars adapted to move loosened gravel inwardly and then outwardly to each side of the pair of wheels; a set of rear cutter bars back of said wheels adapted to collect said gravel from the outside of the wheels and direct it back to the center of the frame; a spreader bar back of said rear cutter bars; and hitch means from said truck attached to said frame between said front and rear cutter bars; rotatable shafts carried by the frame; chains secured to said shafts and removably hooked to said truck; and means for revolving said shafts from the driver's seat of the truck.

7. In combination with a truck having a driver's seat and a pair of wheels, a road drag frame adapted to be carried around said wheels; cutter bars carried under the frame adapted to cut and move dirt back and forth under the frame whereby said wheels do not roll over said dirt and the dirt is levelled behind the wheels; bridge means permitting said wheels to be rolled over and into said frame; a forward transverse shaft carried by the frame in front of the wheels; a rear transverse shaft carried by the frame to the rear of the wheels; chains secured to the forward shaft and extended normally vertically therefrom, one to each side of the truck to be adjustably attached thereto; chains secured to the rear shaft extended normally obliquely, one toward each side of the truck and adjustably attached thereto; gear means on each of said shafts; a standard carried by the frame extending to one side of the driver's seat; shafts carried from said gear means to said standard; and cranks on said shafts for revolving said shafts to selectively raise and lower said frame about said wheels.

8. In combination with a truck having a driver's seat and a pair of wheels, a road drag frame adapted to be carried around said wheels; cutter bars carried under the frame adapted to cut and move dirt back and forth under the frame whereby said wheels do not roll over said dirt and the dirt is levelled behind the wheels; bridge means permitting said wheels to be rolled over and into said frame; a forward transverse shaft carried by the frame in front of the wheels; a rear transverse shaft carried by the frame to the rear of the wheels; chains secured to the forward shaft and extended normally vertically therefrom, one to each side of the truck to be adjustably attached thereto; chains secured to the rear shaft extended normally obliquely, one toward each side of the truck and adjustably attached thereto; gear means on each of said shafts; a standard carried by the frame extending to one side of the driver's seat; shafts carried from said gear means to said standard; and cranks on said shafts for revolving said shafts to selectively raise and lower said frame about said wheels; and drawing means hitching said frame to said truck, said means being attached to said frame between said transverse shafts.

In testimony whereof we affix our signature.

ARTHUR B. COFFIN.
JOHN C. HASKETT.